US007813300B2

(12) United States Patent
Takayama et al.

(10) Patent No.: US 7,813,300 B2
(45) Date of Patent: Oct. 12, 2010

(54) COMMUNICATION SYSTEM, STORAGE MEDIUM HAVING STORED THEREON COMMUNICATION PROGRAM USABLE FOR THE SAME, AND CONNECTION CONTROL APPARATUS DISPLAYING CONNECTION REQUEST ACCORDING TO A SPECIFIED DISPLAY MANNER

(75) Inventors: Takaki Takayama, Kyoto (JP); Hiroaki Tamura, Kyoto (JP); Shoya Tanaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1059 days.

(21) Appl. No.: 11/522,386

(22) Filed: Sep. 18, 2006

(65) Prior Publication Data
US 2007/0168860 A1    Jul. 19, 2007

(30) Foreign Application Priority Data
Jan. 18, 2006  (JP)  .............................. 2006-009639

(51) Int. Cl.
*H04L 12/28* (2006.01)
*H04L 12/56* (2006.01)
*H04B 7/005* (2006.01)

(52) U.S. Cl. .................. 370/254; 370/278; 370/401
(58) Field of Classification Search ................. 370/252, 370/254, 255, 276–278, 395.2, 395.21, 400, 370/401
See application file for complete search history.

(56) References Cited

U.S. PATENT DOCUMENTS

| 7,346,708 | B2 * | 3/2008 | Minamisawa | ................ 709/250 |
| 7,620,027 | B2 * | 11/2009 | Igarashi et al. | .............. 370/341 |
| 2001/0048744 | A1 * | 12/2001 | Kimura | ...................... 380/247 |
| 2004/0151126 | A1 * | 8/2004 | Matsubara | ................... 370/252 |
| 2005/0122963 | A1 * | 6/2005 | Jeon et al. | .................... 370/352 |

FOREIGN PATENT DOCUMENTS

JP    2001-345819    12/2001

* cited by examiner

Primary Examiner—Hong Cho
(74) Attorney, Agent, or Firm—Nixon & Vanderhye P.C.

(57) ABSTRACT

A communication terminal transmits, to an access point apparatus, a connection request which includes communication terminal information for identifying the communication terminal and display manner information representing a display manner in which the communication terminal information is displayed on a display device of the access point apparatus. The access point apparatus displays particulars of the communication terminal information included in the connection request, transmitted from the communication terminal, in the display manner represented by the display manner information included in the connection request. The access point apparatus further allows the user to select whether the communication terminal corresponding to the communication terminal information displayed on the display device is to be permitted for connection or not.

7 Claims, 14 Drawing Sheets

COMMUNICATION SYSTEM, STORAGE MEDIUM HAVING STORED THEREON COMMUNICATION PROGRAM USABLE FOR THE SAME, AND CONNECTION CONTROL APPARATUS DISPLAYING CONNECTION REQUEST ACCORDING TO A SPECIFIED DISPLAY MANNER

CROSS REFERENCE TO RELATED APPLICATION

The disclosure of Japanese Patent Application No. 2006-009639 is incorporated herein by reference.

TECHNICAL FIELD

The exemplary embodiments disclosed herein relate to a communication system, and in particular to a communication system for allowing a communication terminal to communicate via a connection control apparatus such as an access point apparatus or the like.

BACKGROUND AND SUMMARY

One technology regarding a communication system for allowing a mobile terminal to communicate via an access point apparatus is described in patent document 1 (Japanese Laid-Open Patent Publication No. 2001-345819). The technology described in patent document 1 is regarding an authentication procedure between a mobile station and an access point apparatus. According to this technology, in order to obtain a final permission in the authentication procedure, the mobile station requesting authentication notifies a network administrator that the mobile station is in the relevant area and demands that the network administrator should indicate whether the mobile station is permitted or not.

With the technology described in patent document 1, the mobile station requesting authentication notifies the network administrator that the mobile station is in the relevant area, using a display device, a speaker or the like. It is not sufficient to merely notify the existence of the mobile station for the following reason. Where, for example, a plurality of mobile stations are requesting authentication at the same time, the network administrator cannot identify each of the plurality of mobile stations and thus cannot determine which mobile station is to be permitted for connection and which mobile station is not. In addition, the mere notification of the existence cannot sufficiently attract attention of the network administrator for the following reason. Where a plurality of mobile stations requesting authentication are already listed on the display device, a mere addition of a new mobile station on the display may be missed by the network administrator.

A feature of certain exemplary embodiments is to provide a communication system capable of accurately notifying the existence of a plurality of communication terminals requesting a permission for connection, and a communication program and a connection control apparatus usable for the same.

Certain exemplary embodiments have the following aspects to attain the features mentioned above. The reference numerals, additional explanations and the like in parentheses in this section of the specification indicate the correspondence with the exemplary embodiments described later for easier understanding and do not limit the certain exemplary embodiments described herein in any way.

A first exemplary embodiment is directed to a communication system comprising a connection control apparatus (1) for controlling connection to a network (2); and a communication terminal (game apparatus 10) communicable with the connection control apparatus. The communication terminal includes connection request means (CPU core 21 for executing steps S23, S26 and S27). The connection request means transmits a connection request (FIG. 12) to the connection control apparatus. The connection request includes communication terminal information (identification information 53 or user name information 55) for identifying the communication terminal and display manner information (signal flag 62) representing a display manner (normal display shown in FIG. 13 or emphasized display shown in FIG. 14) in which the communication terminal information is displayed on a display device (display section 3c) of the connection control apparatus. The connection control apparatus includes display control means (information processing section 3a for executing steps S56 and S57) and selection means (information processing section 3a for executing step S61). The display control means displays particulars of the communication terminal information included in the connection request, transmitted from the communication terminal, in the display manner represented by the display manner information included in the connection request. The selection means allows a user to select whether the communication terminal corresponding to the communication terminal information displayed on the display device is to be permitted for connection or not.

In a second exemplary embodiment, the communication terminal may further include input acceptance means (CPU core 21 for executing step S25) and request generation means (CPU core 21 for executing steps S26 and S27). The input acceptance means accepts a predetermined operation from the user (operation on the touch panel 15). The request generation means generates a connection request with the particulars of the display manner information being varied in accordance with whether the predetermined operation has been accepted or not.

In a third exemplary embodiment, the input acceptance means may detect whether or not the predetermined operation has been made at an interval of a predetermined time duration. In this case, the request generation means transmits a connection request each time the input acceptance means detects whether or not the predetermined operation has been made.

In a fourth exemplary embodiment, the request generation means may transmit a connection request including display manner information representing a first display manner (emphasized display) when the input acceptance means detects that the predetermined operation has been made, and may transmit a connection request including display manner information representing a second display manner (normal display) which is different from the first display manner when the input acceptance means detects that the predetermined operation has not been made.

In a fifth exemplary embodiment, the communication terminal information may include user information (user name information) which is set by the user in the communication terminal.

A certain exemplary embodiment may be provided as a connection control apparatus included in the communication system or as a storage medium having stored thereon a communication program for causing a computer to execute functions of the communication terminal included in the communication system.

According to the first exemplary embodiment, the display manner of the communication terminal information displayed on the display device of the connection control apparatus varies in accordance with the particulars of the display manner information included in the connection request. Owing to this, even when a plurality of communication terminals request connection at the same time, the user can easily identify the communication terminals by the display manner. The user cannot mistakenly take a game apparatus to be permitted for connection for a game apparatus not to be permitted for connection, or vice versa. The network administrator cannot miss the existence of a new communication terminal requesting connection. The user can be accurately notified of the existence of the plurality of communication terminals requesting permission for connection.

According to the second exemplary embodiment, in accordance with whether or not a predetermined operation is performed by the user, the particulars of the display manner are changed and thus the display manner of the communication terminal information displayed on the display device is changed. Owing to this, the user himself/herself can change the display manner, and can clarify the difference between the display manner of the communication terminal information representing the user's own communication terminal and the display manner of the communication terminal information representing another communication terminal. Therefore, the probability at which the user mistakenly takes his/her own communication terminal for another communication terminal is lowered.

According to the third exemplary embodiment, the input from the user is accepted at an interval of a predetermined time duration, and a connection request including the display manner information reflecting the input from the user is transmitted at an interval of the predetermined time duration. Owing to this, the input from the user can be reflected on the display manner of the communication terminal information displayed on the display device in real time. For example, when the user performs a predetermined operation three times at an interval of 1 second, the display manner of the communication terminal information changes three times at an interval of 1 second. Thus, the difference between the display manner of the communication terminal information representing the user's own communication terminal and the display manner of the communication terminal information representing another communication terminal is more clarified. Therefore, the probability at which the user mistakenly takes his/her own communication terminal for another communication terminal is lowered.

According to the fourth exemplary embodiment, the communication terminal information is displayed on the display device in one of two display manners. Thus, a data amount which can have binary values (i.e., 1 bit) is sufficient for the display manner information. This reduces the data amount of the connection request, and thus reduces the data amount required for the communication between the connection control apparatus and the communication terminal. In the case where the input from the user is reflected on the display manner of the communication terminal information in real time as by the third aspect, two display manners are sufficient to clarify the difference between the communication terminal information representing the user's own communication terminal and the communication terminal information representing another communication terminal.

According to the fifth exemplary embodiment, the user information on the communication terminal requesting registration is displayed on the display device. Since the user information is set by the user himself/herself, the user can easily distinguish whether or not the communication terminal requesting registration is his/her own communication terminal upon checking the user information. This prevents the user from mistakenly registering somebody else's communication terminal.

These and other features, aspects and advantages of the certain exemplary embodiments described herein will become more apparent from the following detailed description when taken in conjunction with the accompanying drawings.

DETAILED DESCRIPTION

Figure 1:
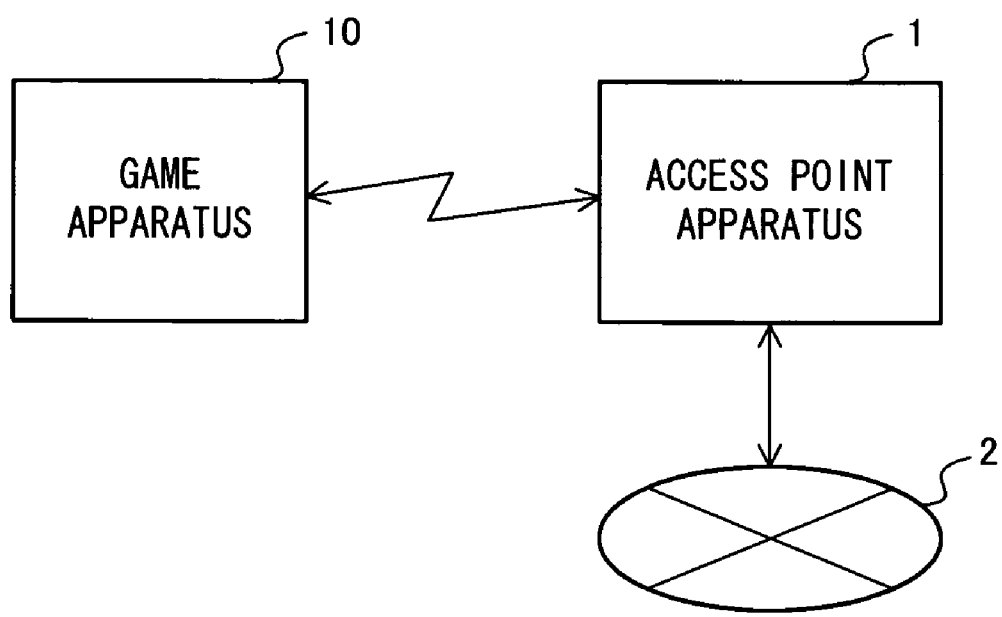
FIG. 1 is a block diagram showing a structure of a game system as an example of a communication system according to an exemplary embodiment.

Hereinafter, a structure of a communication system according to an exemplary embodiment will be described with reference to the drawings. FIG. 1 is a block diagram showing a structure of a game system as one example of the communication system according to this exemplary embodiment. As shown in FIG. 1, the game system includes an access point apparatus 1 and a mobile game apparatus 10 as one exemplary communication terminal. The access point apparatus 1 is wirelessly communicable with the game apparatus 10. When being connected to a network 2 via the access point apparatus 1, the game apparatus 10 can perform a communication game via the network 2. When the access point apparatus 1 is also communicable with another game apparatus, the game apparatus 10 can also perform a communication game through communication with another game apparatus via the access point apparatus 1.

Figure 2:
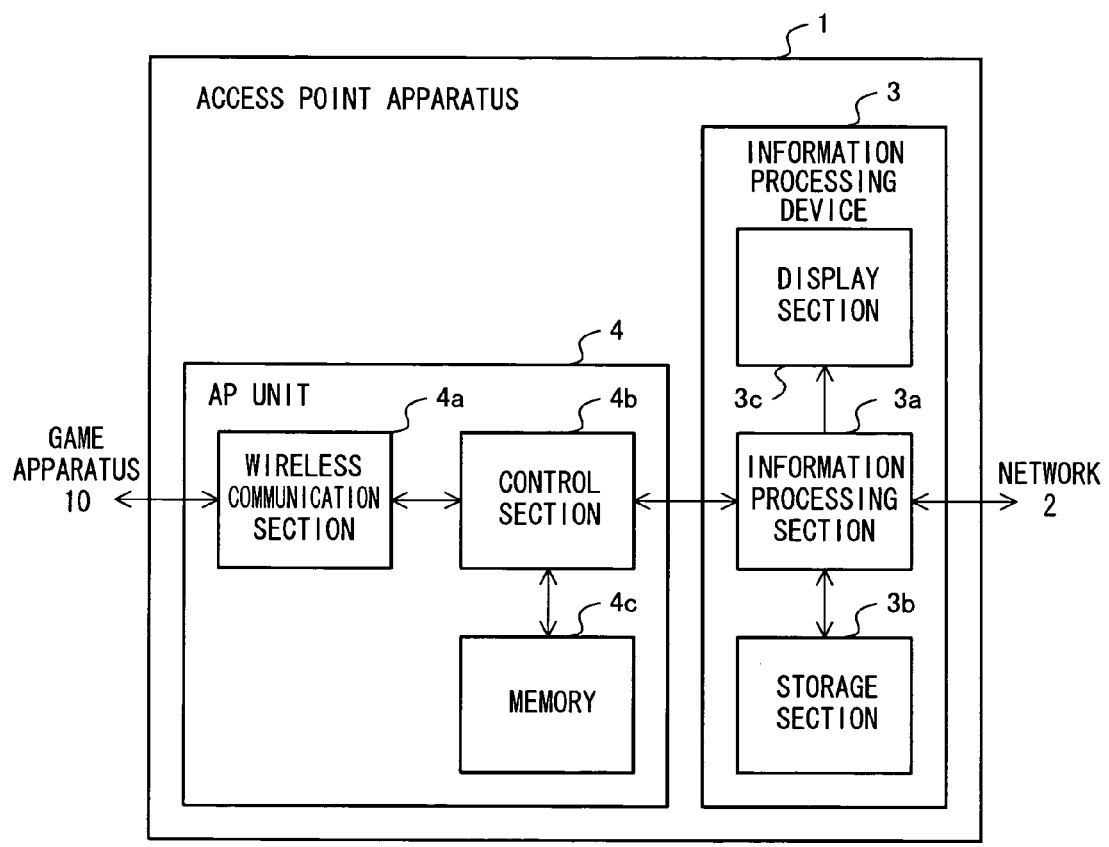
FIG. 2 is a block diagram showing a structure of an access point apparatus shown in FIG. 1.

FIG. 2 is a block diagram showing a structure of the access point apparatus 1 shown in FIG. 1. The access point apparatus 1 includes an information processing device 3 and an access point unit (hereinafter, referred to as an "AP unit"). The information processing device 3 is typically a personal computer and is connectable with the network 2 such as the Internet or the like. In this exemplary embodiment, the information processing device 3 is assumed to be a personal computer connectable with the Internet and has a USB connector. The information processing device 3 includes an information processing section 3a, a storage section 3b, and a display section 3c. The storage section 3b is for storing various data and is, for example, a hard disc or a memory. The information processing section 3a is, for example, a CPU of the personal computer, and performs various information processing by execution of a predetermined program. The display section 3c is, for example, a monitor, and displays various information on a screen in accordance with the control by the information processing section 3a.

The AP unit 4 is detachably connectable with the information processing device 3. In this exemplary embodiment, the AP unit 4 is detachable from the USB connector of the information processing device 3. The AP unit 4 includes a wireless communication section 4a, a control section 4b, and a memory 4c. The wireless communication section 4a performs wireless communication with the game apparatus 10, and has a wireless communication function in compliance with the wireless LAN standards of, for example, IEEE802.11. The control section 4b controls data communication between the wireless communication section 4a and the information processing device 3, and also performs various information processing. The memory 4c is for storing a registration list described below.

In this exemplary embodiment, the access point apparatus 1 includes the information processing device 3 and the AP unit 4. In other exemplary embodiments, the access point apparatus 1 may be one integral apparatus. The processing by the access point apparatus 1 (described below) may be executed by the information processing device 3 or the AP unit 4.

Figure 3:
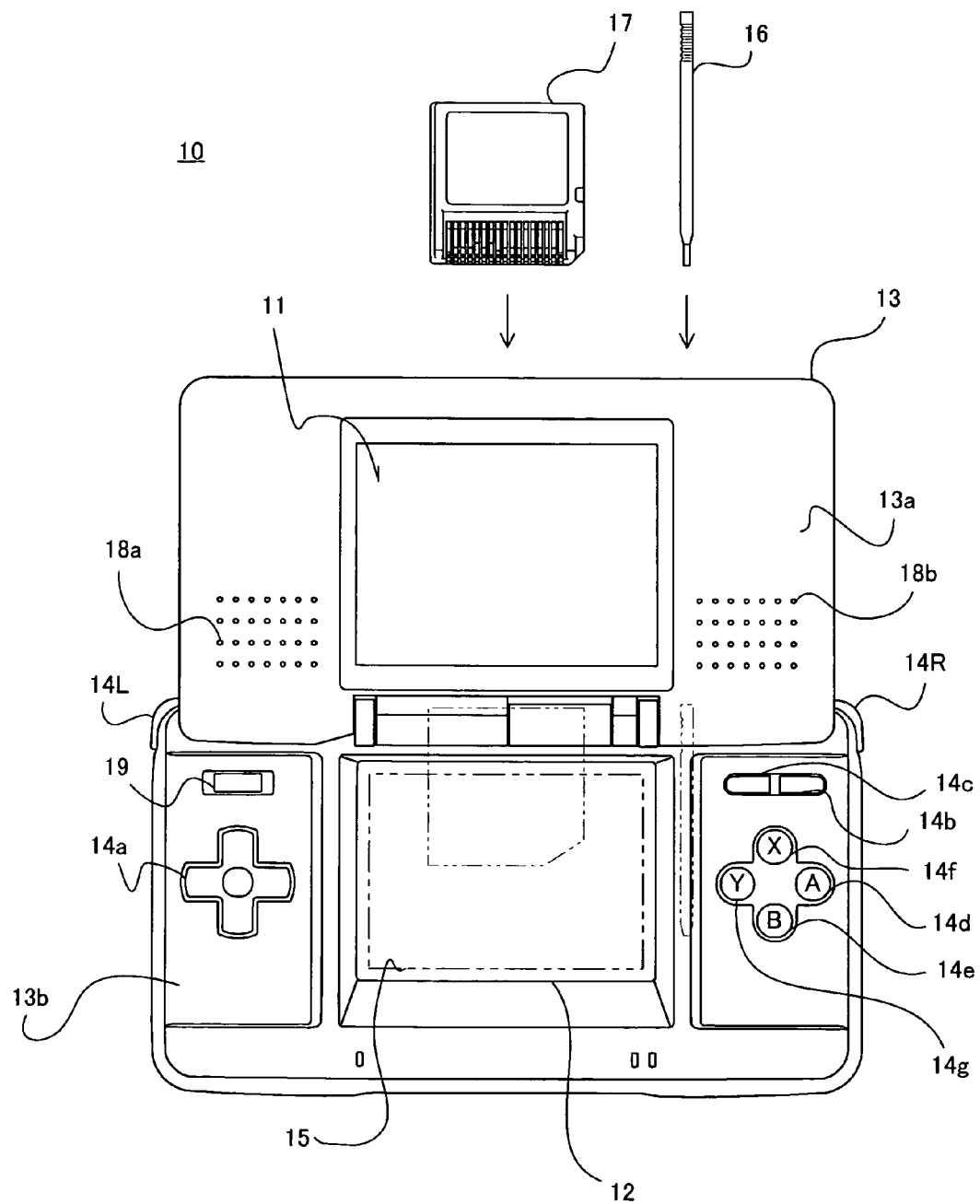
FIG. 3 is an external view of a game apparatus shown in FIG. 1.

Next, a structure of the game apparatus 10 will be described. FIG. 3 is an external view of the game apparatus 10 shown in FIG. 1. As shown in FIG. 3, the game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this exemplary embodiment, LCDs are used as display devices, but alternatively, other arbitrary display devices such as EL (Electro Luminescence) devices or the like are usable. The display devices may have any resolution.

The upper housing 13a has speaker holes 18a and 18b for releasing a sound from a pair of speakers (represented with reference numerals 30a and 30b in FIG. 4) described later.

The lower housing 13b has a cross-shaped switch 14a, a start switch 14b, a select switch 14c, an A button 14d, a B button 14e, an X button 14f, a Y button 14g, an L button 14L and an R button 14R provided thereon as input elements. A touch panel 15 is attached to a screen of the second LCD 12 as an additional input element. The lower housing 13b has a power switch 19 and insertion holes for accommodating a memory card 17 and a stick 16.

The touch panel 15 may be of any system; for example, a resistance film system, an optical (infrared) system, or a static capacitance coupling system. The touch panel 15 has a function of, when a surface thereof is touched with the stick 16, outputting coordinate set data corresponding to the position of the surface touched by the stick 16. Hereinafter, it is assumed that a player operates the touch panel 15 using the stick 16. Alternatively, the player may operate the touch panel 15 using a pen (stylus pen) or his/her finger instead of the stick 16. In this exemplary embodiment, the touch panel 15 has a resolution of 256 dots×192 dots (detection precision) like the second LCD 12. It is not absolutely necessary that the touch panel 15 has the same resolution as that of the second LCD 12.

The memory card 17 is a storage medium having a game program stored thereon, and is detachably attachable into the insertion hole of the lower housing 13b.

Figure 4:
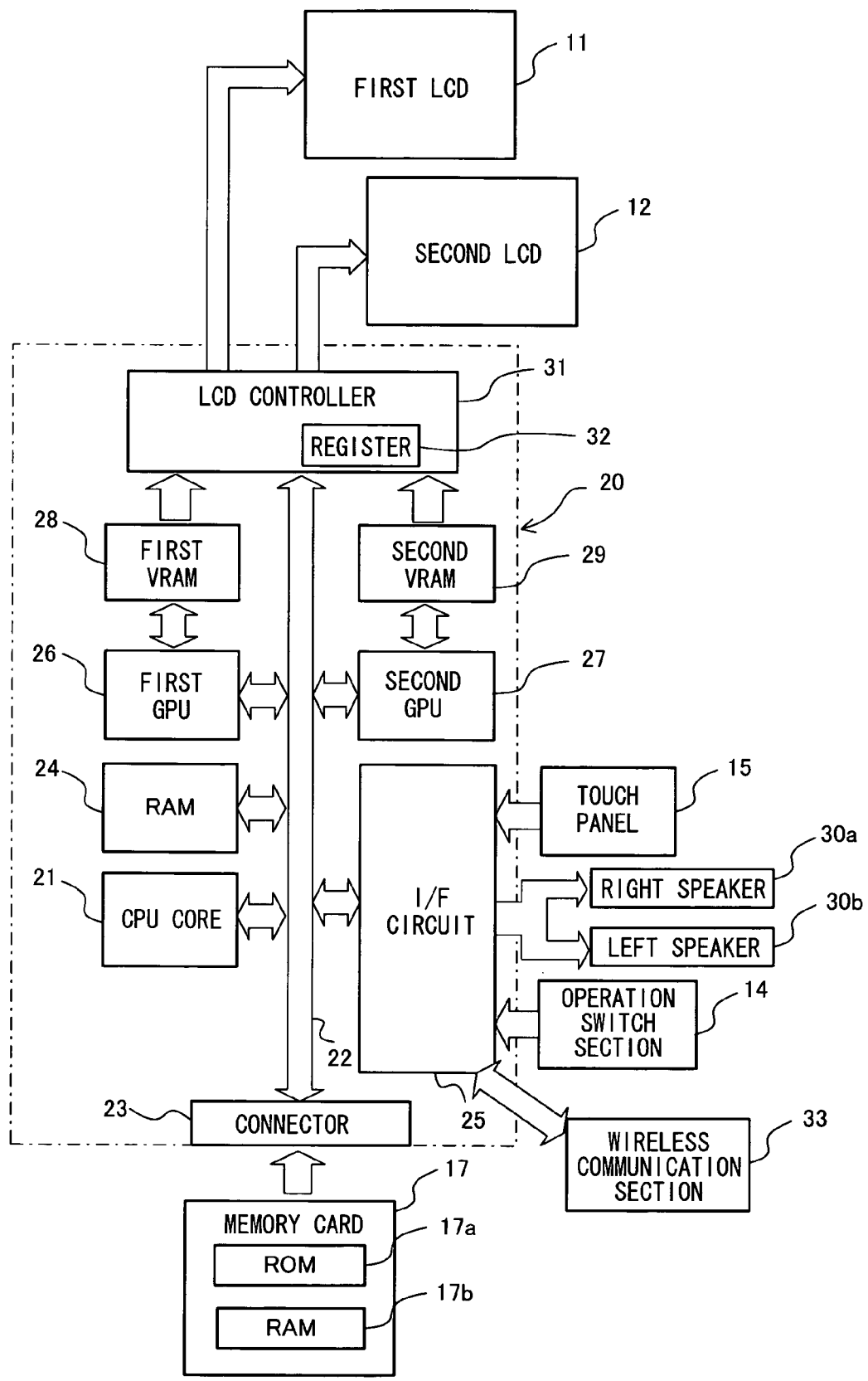
FIG. 4 is an internal structural view of the game apparatus shown in FIG. 1.

Next, with reference to FIG. 4, an internal structure of the game apparatus 10 will be described. As shown in FIG. 4, a CPU core 21 is mounted on an electronic circuit board 20 accommodated in the housing 13. The CPU core 21 is connected to a connector 23 and is also connected to an input/output interface circuit (represented as "I/F circuit" in FIG. 4) 25, a first GPU (Graphics Processing Unit) 26, a second GPU 27, a RAM 24, and an LCD controller 31, via a bus 22. The memory card 17 is detachably connected to the connector 23. The memory card 17 includes a ROM 17a having a game program stored thereon and a RAM 17b having backup data rewritably stored thereon. The game program stored on the ROM 17a of the memory card 17 is loaded onto the RAM 24, and the game program loaded onto the RAM 24 is executed by the CPU core 21. The RAM 24 stores temporary data obtained by the execution of the game program by the CPU core 21 and data for generating game images, as well as the game program. The I/F circuit 25 is connected to the touch panel 15, a right speaker 30a, a left speaker 30b, a wireless communication section 33, and an operation switch section 14 including the cross switch 14a, the A button 14d and the like shown in FIG. 3. The right speaker 30a and the left speaker 30b are respectively located inside the speaker holes 18a and 18b.

The first GPU 26 is connected to a first VRAM (Video RAM) 28, and the second GPU 27 is connected to a second VRAM 29. In response to an instruction from the CPU core 21, the first GPU 26 generates a first game image based on the data stored on the RAM 24 for generating game images, and draws the first game image in the first VRAM 28. Similarly, in response to an instruction from the CPU core 21, the second GPU 27 generates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

The wireless communication section 33 is connected to the I/F circuit 25. The wireless communication section 33 is wirelessly communicable with the wireless communication section 4a of the AP unit 4. The wireless communication section 33 has a function of transferring data used for game processing or other data with the AP unit 4. For example, the wireless communication section 33 has a wireless communication function in compliance with the wireless LAN standards of IEEE802.11. The wireless communication section 33 may have a function of directly transferring data to/from a wireless communication section of other game apparatuses. The wireless communication section 33 outputs the received data to the CPU core 21. The wireless communication section 33 also transmits data instructed by the CPU core 21 to the AP unit 4. When a protocol such as, for example, TCP/IP (Transmission Control Protocol/Internet Protocol) or a predetermined browser is mounted on the wireless communication section 33 or a storage section of the game apparatus 10, the game apparatus 10 can be connected to a network such as the Internet or the like via the access point apparatus 1. The game apparatus 10 communicates with other game apparatuses via the network, and thus a plurality of game apparatuses can perform the same game. The game apparatus 10 can display data of documents, images or the like published on the network, using the first LCD 11 and the second LCD 12, or can execute game processing using game data published on the network.

As described above, using the structures shown in FIG. 1 through FIG. 4, the user of the game apparatus 10 can easily connect the game apparatus 10 to a network by, for example, connecting the AP unit 4 to the personal computer (information processing device 3) in his/her house. Thus, in this exemplary embodiment, the user can easily construct a network communication game system using the mobile game apparatus 10.

The above-described structure of the game apparatus 10 is merely exemplary, and the certain exemplary embodiments described herein are applicable to any computer system which is wirelessly communicable with an access point apparatus.

A game program according to certain exemplary embodiments described herein may be supplied to a computer system via an external storage medium such as the memory card 17 or the like, or via a wired or wireless communication line. The game program may be pre-stored in a non-volatile storage device in the computer system.

Figure 5:
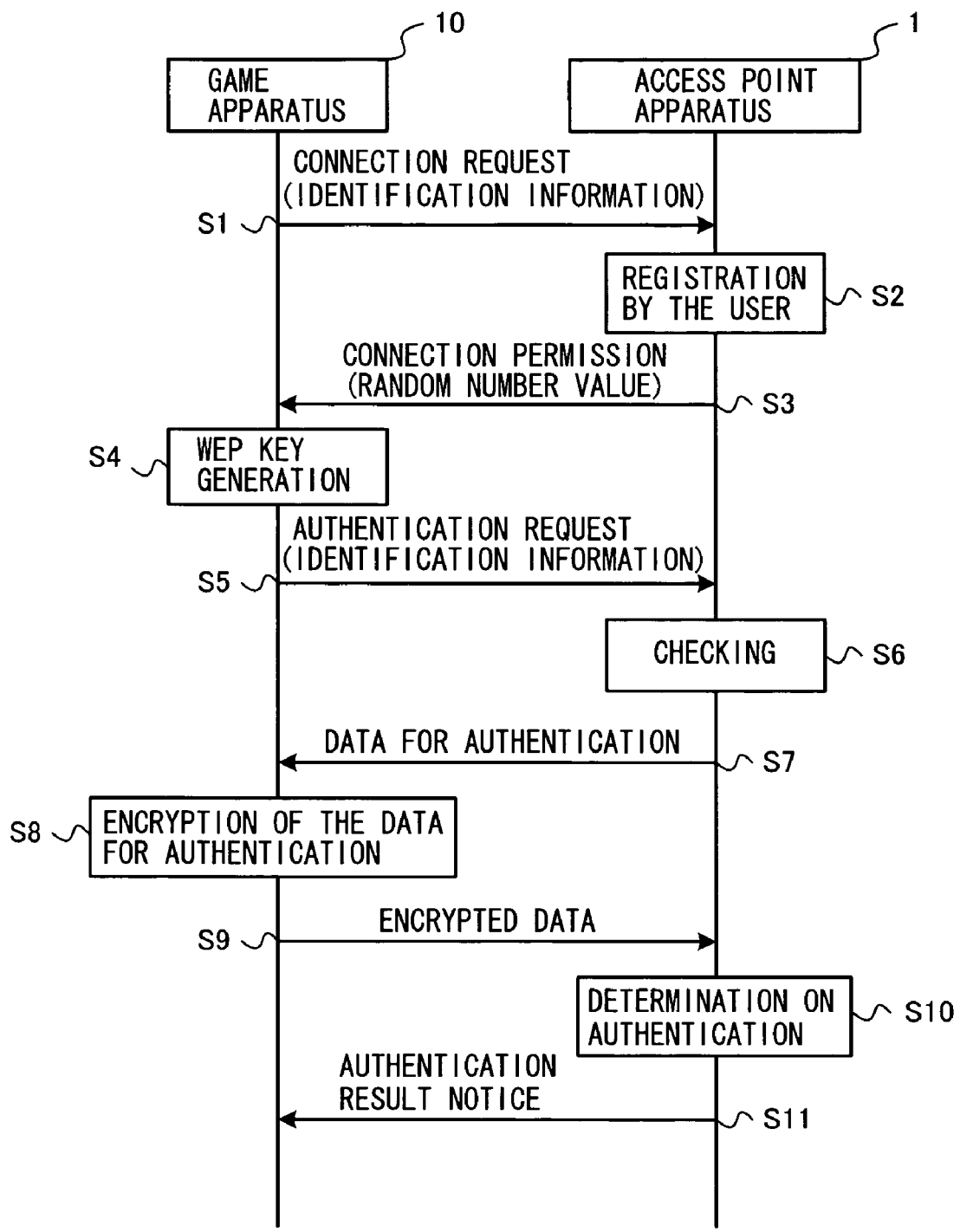
FIG. 5 is a sequence diagram illustrating a flow of data transfer between the game apparatus and the access point apparatus.

Next, an operation of the communication system in this exemplary embodiment will be described. First, with reference to FIG. 5, an overview of the operation of the communication system will be described. FIG. 5 is a sequence diagram illustrating data transfer between the game apparatus 10 and the access point apparatus 1. FIG. 5 shows a flow of processing for establishing communication between the game apparatus 10 and the access point apparatus 1. Hereinafter, an operation of the communication system will be described in the case where the user of the game apparatus 10 attempts to connect the game apparatus 10 to a network via the personal computer in his/her house.

For establishing communication with the access point apparatus 1, the game apparatus 10, in step S1, transmits a connection request to the access point apparatus 1, for connecting the game apparatus 10 itself to the access point apparatus 1. The connection request includes identification information for identifying the game apparatus 10 (see FIG. 12). The identification information is information inherent to the game apparatus 10. In this exemplary embodiment, a MAC address is used as the identification information. In this exemplary embodiment, the game apparatus 10 needs to be registered in the access point apparatus 1 in order to establish communication with the access point apparatus 1. Accordingly, in the case where the game apparatus 10 has not been registered in the access point apparatus 1, the game apparatus 10 transmits a connection request which requests registration to the access point apparatus 1.

In step S2, upon receiving the connection request from the game apparatus 10, the access point apparatus 1 allows the user to select whether or not to register the game apparatus 10. In the case where the user of the game apparatus 10 attempts to connect the game apparatus 10 via a personal computer in his/her house, the user who conducts the selection is the user of the game apparatus 10. The user inputs an instruction to the access point apparatus 1 on whether or not to register the game apparatus 10. Thus, the user can register the game apparatus 10 in the access point apparatus 1.

Next in step S3, the access point apparatus 1 transmits information representing whether or not the connection has been permitted (connection response) to the game apparatus 10. In FIG. 5, a connection response indicating that the connection has been permitted is transmitted, assuming that an instruction to register the game apparatus 10 is input in step S2. In this case, the connection response includes a random number value.

In step S4, upon receiving the connection response indicating that the connection has been permitted, the game apparatus 10 generates a WEP key to be used in authentication processing executed later (steps S7 through S11). The WEP key is generated from the random number value included in the connection response in accordance with a predetermined key generation algorithm. The same key generation algorithm is prepared in the game apparatus 10 and the access point apparatus 1.

In step S5, upon generating the WEP key, the game apparatus 10 transmits information requesting the access point apparatus 1 for execution of the authentication processing (authentication request) to the access point apparatus 1. The authentication request includes the identification information.

In step S6, upon receiving the authentication request from the game apparatus 10, the access point apparatus 1 checks the identification information included in the authentication request against the registered identification information. In other words, the access point apparatus 1 determines whether or not the identification information of the game apparatus 10 is registered in the access point apparatus 1. When it is determined in step S6 that the identification information of the game apparatus 10 is registered in the access point apparatus 1, the authentication processing in steps S7 through S11 is executed. By contrast, when it is determined in step S6 that the identification information of the game apparatus 10 is not registered in the access point apparatus 1 (not shown in FIG. 5), the authentication processing is not executed, and the communication connection between the game apparatus 10 and the access point apparatus 1 results in a failure.

In step S7, the access point apparatus 1 transmits data for authentication, which is used for the authentication processing, to the game apparatus 10. In step S8, the game apparatus 10 encrypts the data for authentication transmitted from the access point apparatus 1 using the WEP key generated in step S4. Next in step S9, the encrypted data for authentication is transmitted from the game apparatus 10 to the access point apparatus 1. In step S10, upon receiving the encrypted data for authentication, the access point apparatus 1 determines whether or not the authentication has been successful. Specifically, the access point apparatus 1 decrypts the encrypted data for authentication using the WEP key and determines whether or not the decrypted data for authentication matches the data for authentication transmitted in step S7. Then in step S11, the access point apparatus 1 transmits a notice representing the result of authentication (authentication result notice) to the game apparatus 10. With the steps S7 through S11, the authentication processing is finished. When the authentication is successfully executed, communication connection is established between the game apparatus 10 and the access point apparatus 1, and data communication is started.

As described above, in this exemplary embodiment, the user selects whether or not to permit the connection (step S2) before the authentication processing (steps S7 through S11) is executed using the encryption key. Therefore, for a game apparatus determined by the user not to be permitted for connection, the connection fails without the authentication processing being executed. This avoids unnecessary authentication processing and improves the efficiency of authentication processing.

Conventionally, the user manually inputs a MAC address (identification information) of the communication terminal to the access point apparatus in order to register the communication terminal. This is very troublesome to the user. By contrast, in this exemplary embodiment, the game apparatus transmits a connection request including the identification information and thus the access point apparatus automatically acquires the identification information. Therefore, the user can easily register the identification information with no need of manual input.

Figure 6:
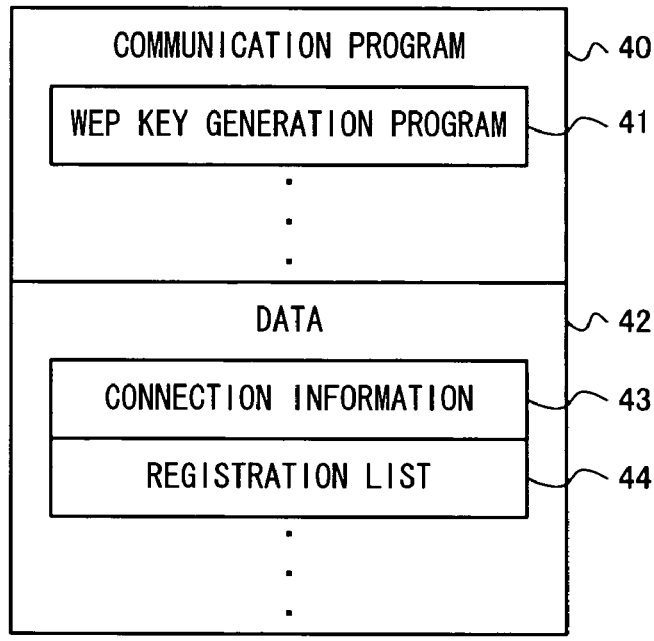
FIG. 6 shows data stored in a storage device of the access point apparatus.

Next, with reference to FIG. 6 through FIG. 15, processing performed by the communication system will be described in detail. First, data usable in each apparatus (the game apparatus 10 and the access point apparatus 1) for the processing will be described. FIG. 6 shows data stored in a storage device (the storage section 3b of the information processing device 3 or the memory 4c of the AP unit 4) of the access point apparatus 1. In the storage device, a communication program 40 and various data 42 are stored.

The communication program 40 is for the access point apparatus 1 to perform the communication processing. The communication program 40 includes a WEP key generation program 41. The WEP key generation program 41 is for generating a WEP key from a predetermined random number value in accordance with a predetermined algorithm. In this example, the access point apparatus 1 executes the WEP key generation program 41 to generate a 104-bit WEP key from a 20-byte random number value. Although not shown, the communication program 40 includes programs for executing various communication processing in addition to the WEP key generation program 41. In this exemplary embodiment, the function of generating the WEP key is realized by the access point apparatus 1 executing the WEP key generation program 41. In other exemplary embodiments, the function of generating the WEP key may be realized by a dedicated circuit.

As shown in FIG. 6, connection information 43 and a registration list 44 are stored in the storage device of the access point apparatus 1. The connection information 43 is for identifying a wireless network including the access point apparatus 1. In this exemplary embodiment, the first 8 bytes of an SSID which is set in the access point apparatus 1 is used as the connection information 43. The registration list 44 is a list of identification information of game apparatuses permitted to be connected to the access point apparatus 1. In this exemplary embodiment, the registration list 44 is stored on the memory 4c of the AP unit 4.

Figure 7:
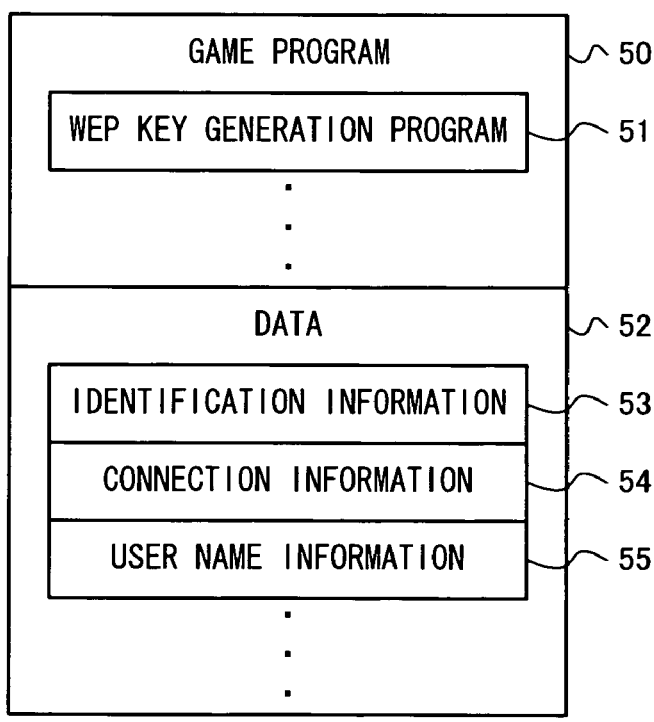
FIG. 7 shows data stored on a RAM of the game apparatus.

FIG. 7 shows data stored on the RAM 24 of the game apparatus 10. On the RAM 24, a game program 50 and various data 52 are stored.

The game program 50 is read from the memory card 17 when the game apparatus 10 is started and stored on the RAM 24. The game program 50 includes a WEP key generation program 51. Like the WEP key program 41 stored in the access point apparatus 1, the WEP key program 51 is for generating a WEP key from a predetermined random number value in accordance with a predetermined algorithm. The WEP key generation program 51 has the same algorithm as the WEP key generation program 41 stored in the access point apparatus 1. Namely, a WEP key obtained by executing the WEP key generation program 41 from a certain random number value is the same as the WEP key obtained by executing the WEP key generation program 51 from the certain random number value. Although not shown, the game program 50 includes programs for executing various game processing in addition to the WEP key generation program 51.

As shown in FIG. 7, the RAM 24 has stored thereon identification information 53, connection information 54, and user name information 55. The identification information 53 is, as described above, information for identifying the game apparatus 10. In this exemplary embodiment, a MAC address is used as the identification information 53.

The connection information 54 is the same as the connection information 43. In this exemplary embodiment, the first 8 bytes of an SSID which is set in the game apparatus 10 is used as the connection information 54. Namely, each game apparatus connectable to the access point apparatus 1 has an SSID set therein having a common first 8 bytes with that of the SSID in the access point apparatus 1.

The user name information 55 is set by the user of the game apparatus 10 and is, for example, a name of the user of the game apparatus 10. In this exemplary embodiment, it is assumed that the user of the game apparatus 10 registers his/her nickname or actual name in the game apparatus 10 as the user name. The user can distinguish whether or not a game apparatus is his/her apparatus by the user name registered therein.

Figure 8:
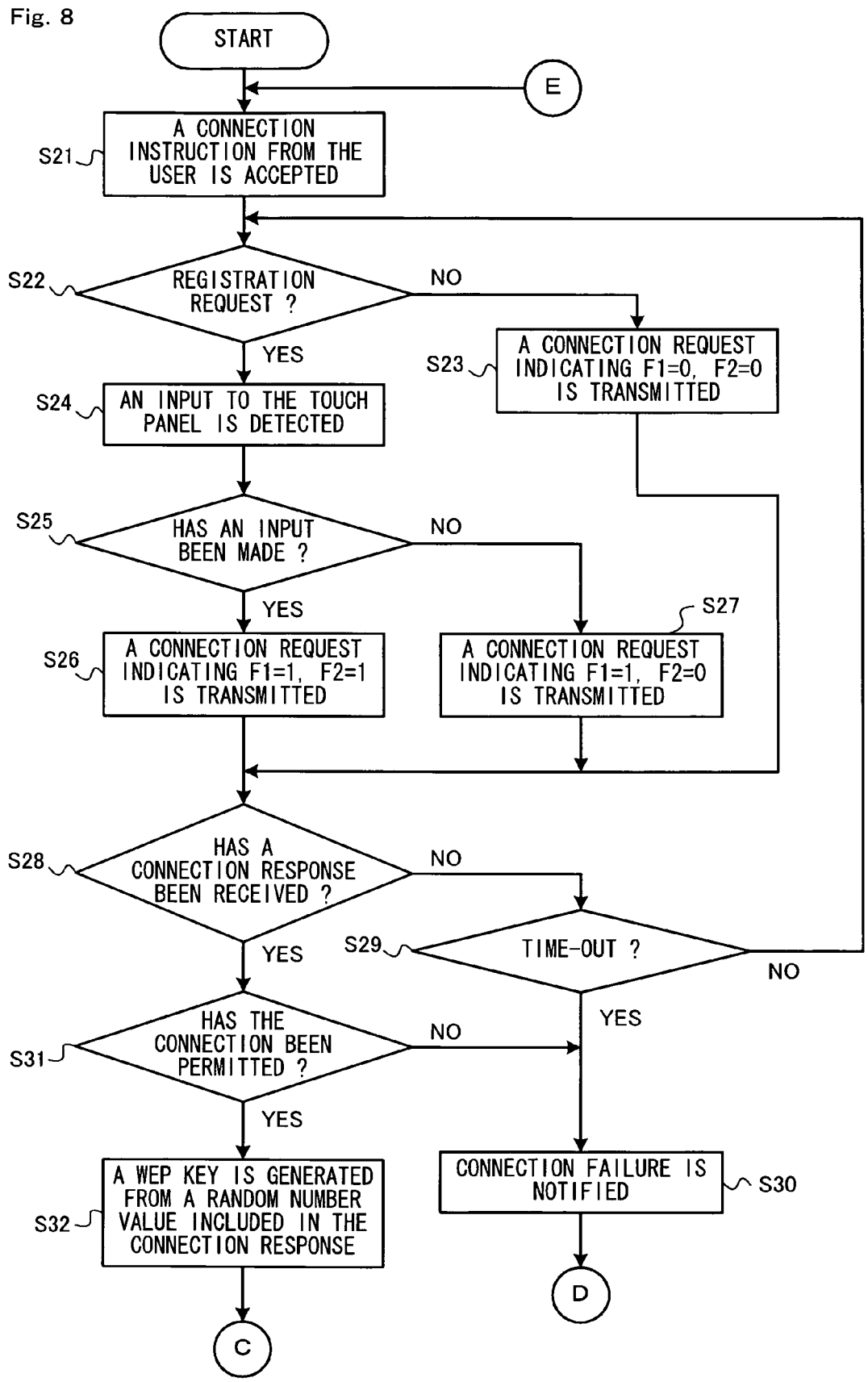
FIG. 8 is a flowchart illustrating a flow of processing executed by the game apparatus.
Figure 9:
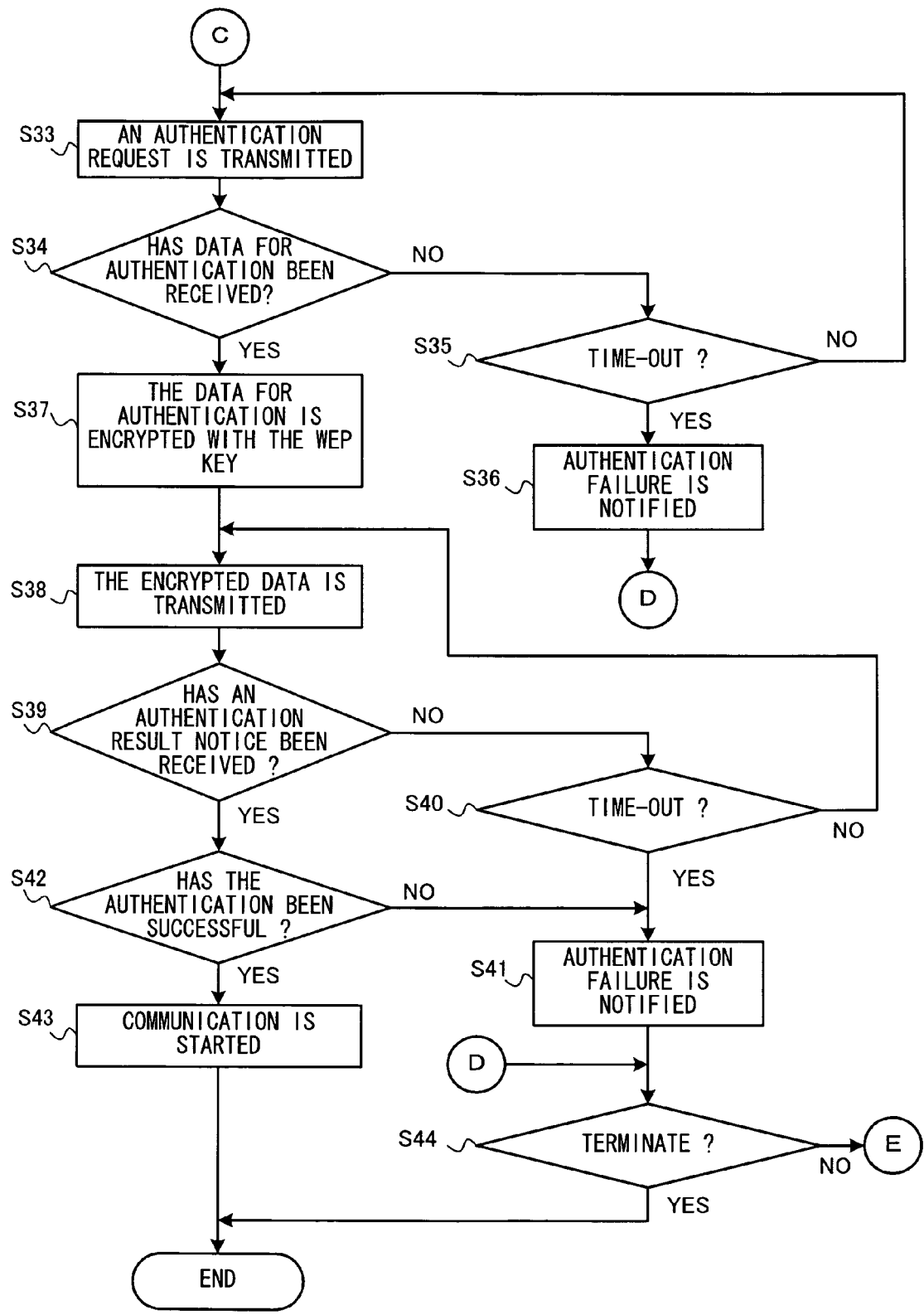
FIG. 9 is a flowchart illustrating a flow of the processing executed by the game apparatus.
Figure 10:
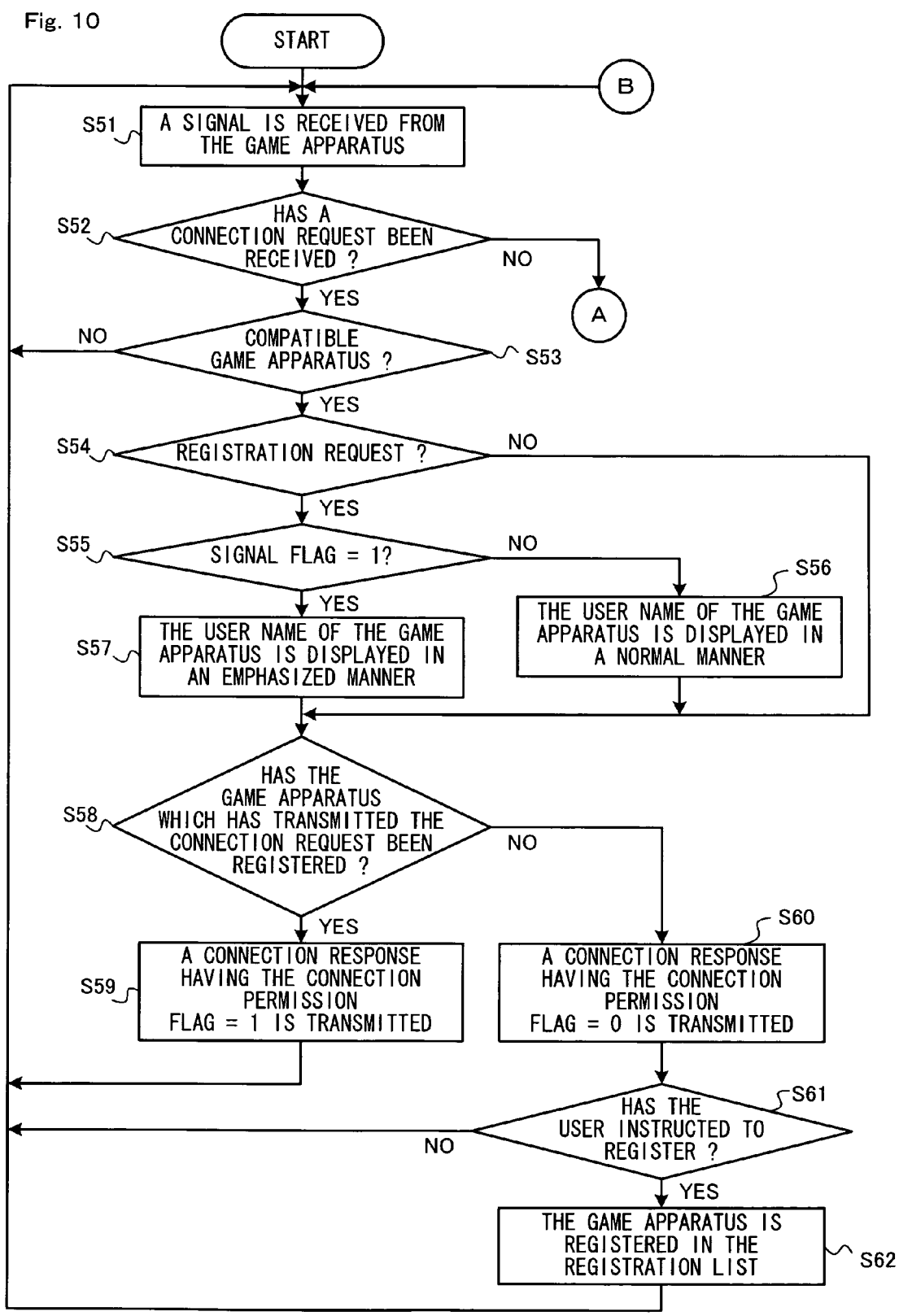
FIG. 10 is a flowchart illustrating a flow of processing executed by the access point apparatus.
Figure 11:
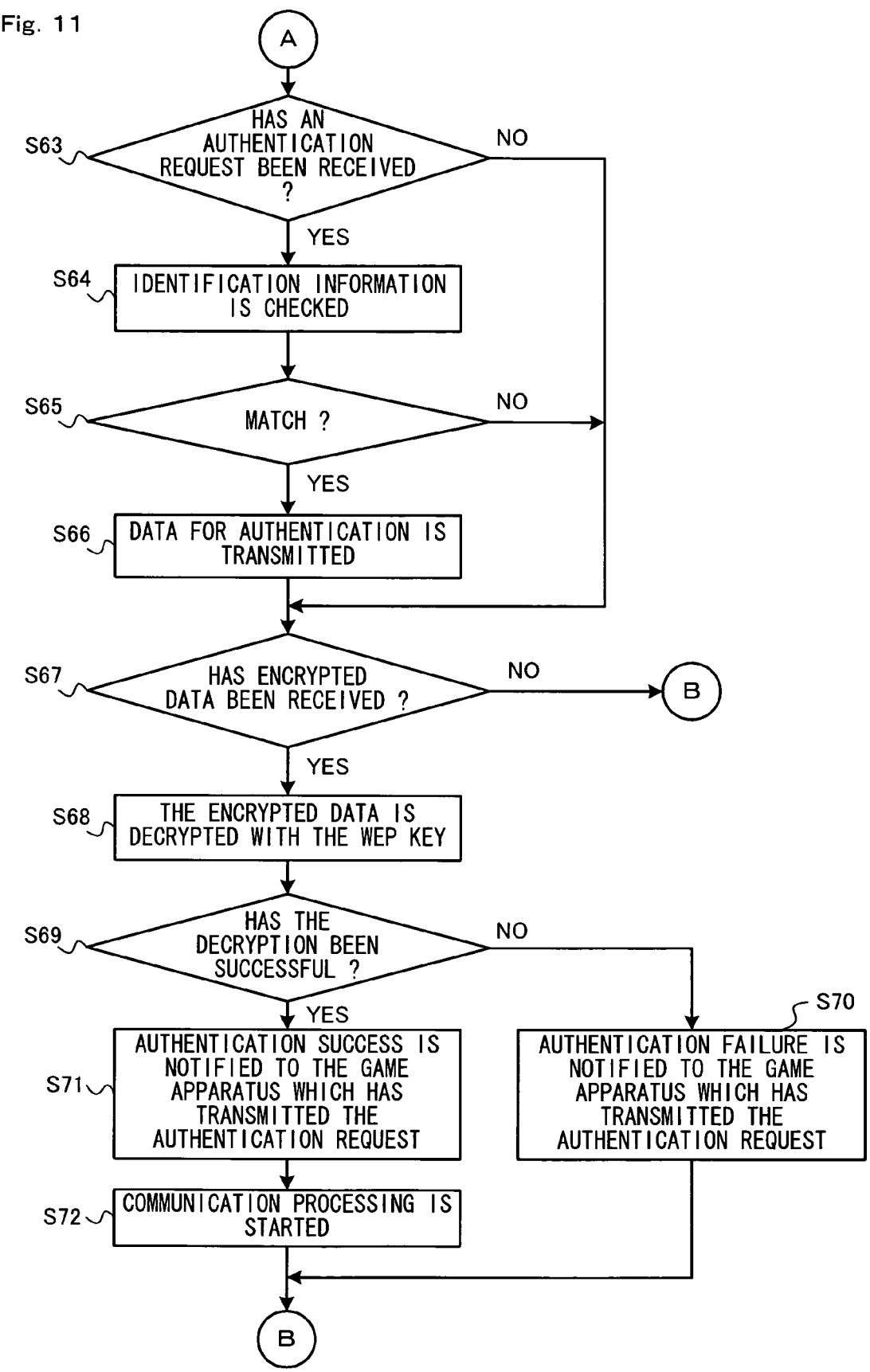
FIG. 11 is a flowchart illustrating a flow of the processing executed by the access point apparatus.

Next, with reference to FIG. 8 through FIG. 15, processing executed by the game apparatus 10 and the access point 1 will be described in detail. FIG. 8 and FIG. 9 are a flowchart illustrating a flow of processing executed by the game apparatus 10. FIG. 10 and FIG. 11 are a flowchart illustrating a flow of processing executed by the access point apparatus 1. When the game apparatus 10 is turned on, the CPU core 21 of the game apparatus 10 executes a start program stored on a boot ROM (not shown) to initialize the elements including the RAM 24. The game program stored on the memory card 17 is read into the RAM 24, and thus the CPU core 21 starts the execution of the game program. The flowchart in FIG. 8 illustrates the game processing executed after such processing is completed. With reference to FIG. 8 through FIG. 11, processing for establishing the communication between the game apparatus 10 and the access point apparatus 1 will be described in detail, and other processing which is irrelevant to the certain exemplary embodiments described herein will not be described in detail.

Referring to FIG. 8, in step S21, the CPU core 21 accepts an instruction to connect the game apparatus 10 to the access point apparatus 1. In this example, there are two types of such instructions. Specifically, one type of instruction is to request registration and connect the game apparatus 10 to the access point apparatus 1 (first instruction), and the other type of instruction is to connect the game apparatus 10 to the access point apparatus 1 without requesting registration (second instruction). In step S21, the user is allowed to select which instruction to be made. Namely, the user selects the first instruction or the second instruction. The first instruction should be made when the game apparatus 10 has not been registered, and the second instruction should be made when the game apparatus 10 has already been registered. The user selects one of the instructions in accordance with whether or not the game apparatus 10 has already been registered.

When the instruction to connect the game apparatus 10 to the access point apparatus 1 is received in step S21, the game apparatus 10 transmits a connection request to the access point apparatus 1 in the subsequent processing (step S23, S26 or S27). The connection request will be described in detail with reference to FIG. 12.

Figure 12:
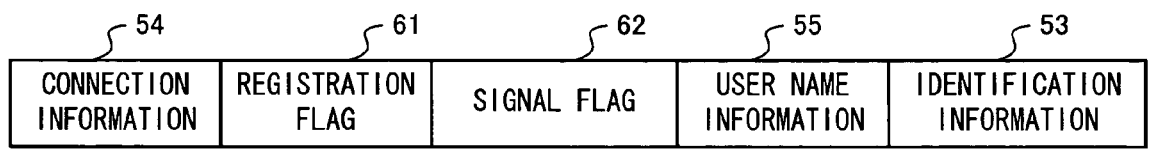
FIG. 12 shows a content of data of a connection request.

FIG. 12 shows a content of data of the connection request. As shown in FIG. 12, the connection request includes the connection information 54, the identification information 53, and the user name information 55 described above. The information 53 through 55 are read from the RAM 24 and transmitted as a part of the connection request. The connection request may include, for example, the type of the game apparatus 10 (model name) in addition to the information 53 through 55.

The connection request includes a registration flag 61 and a signal flag 62. The registration flag 61 indicates whether or not the connection request requests registration. When the connection request requests registration, the registration flag 61 is set to "1"; whereas when the connection request does not request registration, the registration flag 61 is set to "0".

The signal flag 62 indicates whether or not the user has performed a predetermined input to the game apparatus 10 when the connection request is transmitted. When the user has performed the predetermined input, the signal flag 62 is set to "1"; whereas when the user has not performed the predetermined input, the signal flag 62 is set to "0". In this exemplary embodiment, the predetermined input is an input to the touch panel 15.

Returning to FIG. 8, in step S22, it is determined whether or not the instruction received in step S21 requests registration. Namely, it is determined whether the instruction received in step S21 is the first instruction or the second instruction. When it is determined that the instruction requests registration, processing in step S24 is executed. By contrast, when it is determined that the instruction does not request registration, processing in step S23 is executed.

In step S23, a connection request which does not request registration is transmitted to the access point apparatus 1. Namely, the CPU core 21 transmits a connection request having the registration flag 61 ("F1" in FIG. 8) of "0" and the signal flag 62 ("F2" in FIG. 8) of "0" from the wireless communication section 33. Then, processing in step S28 is executed as described below.

In step S24, the CPU core 21 detects whether or not an input to the touch panel 15 has been made. In other words, the CPU core 21 obtains data, indicating whether or not an input to the touch panel 15 has been made, from the touch panel 15. It is sufficient to detect whether or not an input to the touch panel 15 has been made, and it is not necessary to detect a coordinate set of the input. From when the instruction for connection from the user is accepted until the connection response is received (the processing loop of steps S22 through S29), the processing in step S24 is executed at an interval of a predetermined time duration. As described below in detail regarding steps S56 and S57, when the game apparatus 10 requests registration, information on the game apparatus 10 (e.g., the user name) is displayed on the display section 3c of the access point apparatus 1. When no input to the touch panel 15 has been made, the information is displayed in a normal manner. When an input to the touch panel 15 has been made, the information is displayed in an emphasized manner. Namely, the input to the touch panel 15 in step S24 is made for displaying the information regarding the game apparatus 10 in such an emphasized manner.

In step S25, it is determined whether or not an input to the touch panel 15 has been made in step S24. When it is determined that an input to the touch panel 15 has been made, processing in step S26 is executed. By contrast, when it is determined that no input to the touch panel 15 has been made, processing in step S27 is executed.

In step S26, the CPU core 21 transmits a connection request to the access point apparatus 1 which requests registration and represents emphasized display in the access point apparatus 1. Namely, the CPU core 21 transmits a connection request having the registration flag 61 of "1" and the signal flag 62 of "1" from the wireless communication section 33. Then, processing in step S28 is executed as described below.

In step S27, the CPU core 21 transmits a connection request to the access point apparatus 1 which requests registration and represents normal display in the access point apparatus 1. Namely, the CPU core 21 transmits a connection request having the registration flag 61 of "1" and the signal flag 62 of "0" from the wireless communication section 33. As described above regarding steps S26 and S27, in this exemplary embodiment, in accordance with whether or not a predetermined operation (an operation on the touch panel 15) has been accepted, a connection request having a different value of the signal flag 62 is generated. From when the instruction for connection from the user is accepted until the connection response is received (the processing loop of steps S22 through S29), a connection request is transmitted at an interval of a predetermined time duration. After step S27, processing in step S28 is executed as described below.

In step S23, S26 or S27, the game apparatus 10 transmits a connection request to the access point apparatus 1. In step S28, it is determined whether or not a connection response has been received from the access point apparatus 1 in response to the connection request.

When it is determined in step S28 that no connection response has been received, it is determined in step S29 whether or not a time-out has been generated, i.e., whether or not a predetermined time duration has passed since the connection request was first transmitted. When it is determined that a time-out has been generated, processing in step S30 is executed. In step S30, it is notified to the user that the connection resulted in a failure. For example, the CPU core 21 displays a message that "the game apparatus could not be connected to the access apparatus" on the first LCD 11 or the second LCD 12. After step S30, processing in step S44 is executed as described below.

When it is determined in step S29 that no time-out has been generated, the processing in step S22 and thereafter is repeated to transmit a connection request again. The game apparatus 10 transmits a connection request in repetition until the time-out is generated. When it is determined in step S28 that the connection response has been received, processing in step S31 is executed as described below.

Next, processing executed by the access point apparatus 1 when receiving a connection request from the game apparatus 10 will be described. Referring to FIG. 10, in step S51, the access point apparatus 1 receives a signal from the game apparatus 10. A signal from the game apparatus 10 is the connection request described above, an authentication request, or encrypted data for authentication. When no signal is received from the game apparatus 10 in step S51, the processing in step S51 is executed again. The processing in step S52 and thereafter is executed by some signal being received from the game apparatus 10. The processing in step S52 and thereafter shown in FIG. 10 and FIG. 11 is executed such that the processing in step S51 is repeated at each predetermined time duration.

In step S52, it is determined whether or not a connection request has been received in step S51. When it is determined that a connection request has been received, processing in step S53 is executed. By contrast, when it is determined that no connection request has been received, i.e., when a signal other than the connection request has been received, processing in step S63 is executed as described below.

In step S53, it is determined whether or not the communication terminal (game apparatus 10) which has transmitted the connection request is compatible with the access point apparatus 1. Namely, it is determined whether or not the communication terminal which has transmitted the connection request is wirelessly communicable with the access point apparatus 1. Specifically, the access point apparatus 1 refers to the connection information included in the connection request received in step S51 to determine whether or not the connection information matches connection information stored in the access point apparatus 1. Namely, the access point apparatus 1 determines whether or not the first 8 bytes of the SSID in the communication terminal which has transmitted the connection request matches that in the access point apparatus 1. When the two pieces of information match each other, the access point apparatus 1 determines that the communication terminal is compatible with the access point apparatus 1. When it is determined in step S53 that the communication terminal is compatible with the access point apparatus 1, processing in step S54 is executed. By contrast, when it is determined in step S53 that the communication terminal is not compatible with the access point apparatus 1, processing returns to step S51. Namely, the access point apparatus 1 ignores the connection request from a communication terminal not compatible therewith and does not permit connection with such a communication terminal.

In step S54, it is determined whether or not the connection request received in step S51 requests registration. This determination is made based on the value of the registration flag 61 included in the connection request. When the registration flag 61 is "1", the connection request is determined to request registration; whereas when the registration flag 61 is "0", the connection request is determined not to request registration. When it is determined in step S54 that the connection request requests registration, processing in step S55 is executed. By contrast, when it is determined in step S54 that the connection request does not request registration, processing in step S58 is executed as described below.

In step S55, it is determined whether or not the connection request received in step S51 represents emphasized display. This determination is made based on the value of the signal flag 62 included in the connection request. When the signal flag 62 is "1", the connection request is determined to represent emphasized display; whereas when the signal flag 62 is "0", the connection request is determined not to represent emphasized display. When it is determined in step S55 that the connection request represents emphasized display, processing in step S57 is executed. By contrast, when it is determined in step S55 that the connection request does not represent emphasized display, processing in step S56 is executed.

Figure 13:
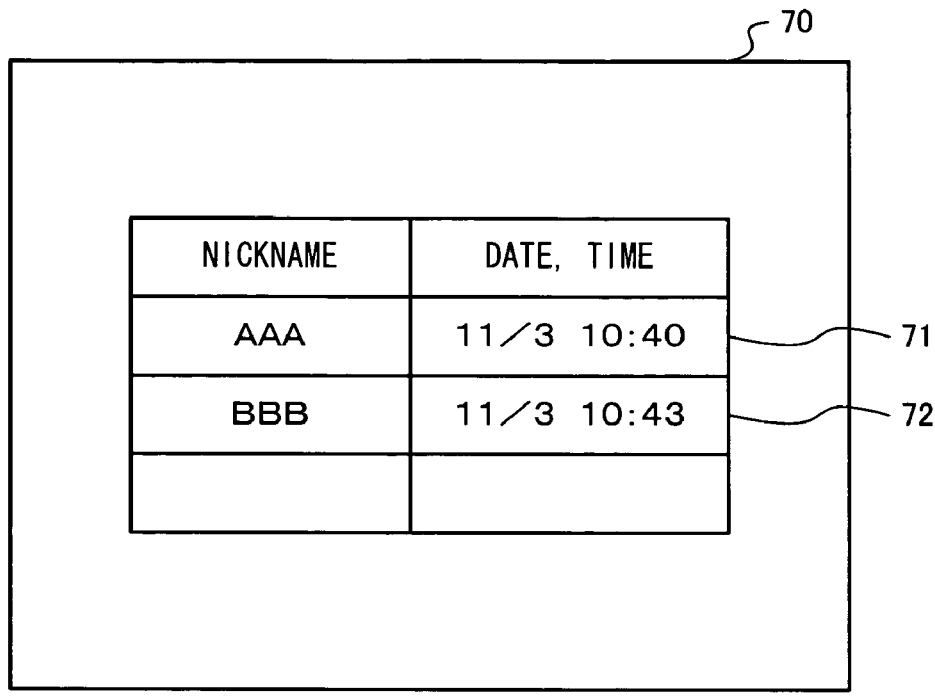
FIG. 13 shows an exemplary normal display on a screen of a display section.

In step S56, the information on the game apparatus 10 which has transmitted the connection request is displayed in a normal manner. FIG. 13 shows an exemplary normal display on a screen 70 of the display section 3c. As shown in FIG. 13, when the access point apparatus 1 has received a connection request requesting registration, a table associating the user name information of the game apparatus 10 which has transmitted the connection request and the time and date at which the connection request was received is displayed on the screen 70. Since the connection request includes the user name information (see FIG. 12), the access point apparatus 1 can obtain the user name information of the game apparatus 10 which has transmitted the connection request from the connection request. For example, the MAC address may be displayed on the screen 70, but it is difficult for the user to determine whether the MAC address is the MAC address of his/her own game apparatus or a game apparatus of somebody else. By contrast, in the case where the user name information is displayed, the user can determine whether the information on his/her own game apparatus or the information on a game apparatus of somebody else is displayed. Therefore, the user can easily recognize whether or not his/her own game apparatus is connected to the access point apparatus 1.

When the access point apparatus 1 has received a connection request requesting registration from a plurality of game apparatuses, a plurality of sets of nickname (user name information) and receiving time/date are displayed on the screen 70 as shown in FIG. 13. In the example of FIG. 13, it is appreciated that a game apparatus of a user having a nickname "AAA" and a game apparatus of a user having a nickname "BBB" are requesting registration in the access point apparatus 1.

Figure 14:
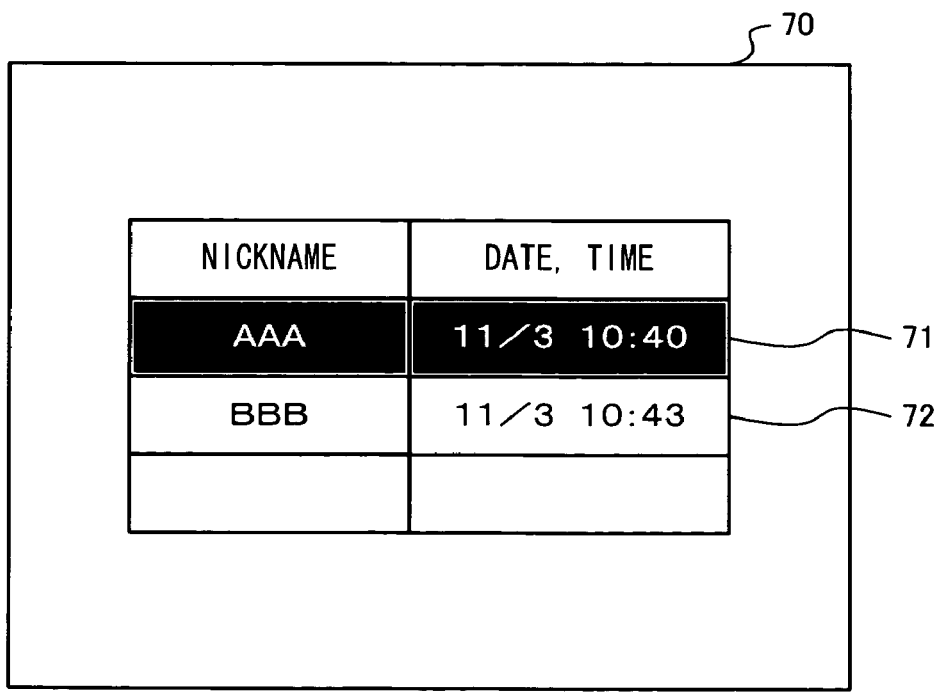
FIG. 14 shows an exemplary emphasized display on the screen of the display section.

Returning to FIG. 10, in step S57, the information on the game apparatus 10 which has transmitted the connection request is displayed in an emphasized manner. FIG. 14 shows an exemplary emphasized display on the screen 70 of the display section 3c. In the example of FIG. 14, the access point apparatus 1 has received a connection request representing emphasized display from the game apparatus of the user having the nickname "AAA". In step S57, like in step S56, when the access point apparatus 1 has received a connection request requesting registration, the nickname of the user of the game apparatus which has transmitted the connection request and the time and date at which the connection request was received are displayed on the screen 70. In step S57, the user name information on the game apparatus which has transmitted the connection request representing emphasized display (in FIG. 14, the game apparatus of the user having the nickname "AAA") and the receiving time/date is displayed in an emphasized manner. In this example, the color of the letters and the color of the background are inverted in one form of emphasis. In another form of emphasis, the letters of the user name information and the receiving time/date may be flashed (blinked), or an image of an icon, a character or the like may appear over (or in the vicinity of) the user name information.

As described above regarding steps S56 and S57, in this exemplary embodiment, the manner of displaying the information (e.g., the user name information) on the game apparatus which has transmitted the connection request varies in accordance with whether the connection request represents emphasized display or normal display. Whether emphasized display is to be performed or normal display is to be performed is determined by the value of the signal flag 62. In this sense, the signal flag 62 is regarded as information which represents the display manner of the user name information of the game apparatus 10 on the display section 3c of the access point apparatus 1.

The value of the signal flag 62 is varied in accordance with whether or not an input to the touch panel 15 has been made. The user of the game apparatus can indicate his/her intention to perform emphasized display or normal display by making, or by not making, an input to the touch panel 15 (steps S24 through S27). Therefore, the display on the screen 70 of the access point apparatus 1 is inverted when the user has performed a predetermined operation (when the user has made an input to the touch panel 15). Even when a plurality of nicknames regarding a plurality of game apparatuses are displayed on the screen 70, the user can easily find a nickname inverted on the screen 70 in accordance with the input to the touch panel 15. Namely, the display manner on the access point apparatus 1 is varied in accordance with the input to the game apparatus 10, such that the user can easily find out whether or not a connection request from his/her game apparatus has been received by the access point apparatus 1. When the information regarding his/her game apparatus is displayed, the user can easily determine which is the information on his/her game apparatus.

After step S56 or S57, processing in step S58 is executed. In step S58, it is determined whether or not the game apparatus 10 which has transmitted the connection request received in step S51 has been already registered. The CPU core 21 checks whether or not the registration list 44 includes the identification information included in the connection request received in step S51. When the registration list 44 includes the identification information included in the connection request received in step S51, it is determined that the game apparatus 10 has already been registered. By contrast, when the registration list 44 does not include the identification information included in the connection request received in step S51, it is determined that the game apparatus 10 has not been registered. When it is determined in step S58 that the game apparatus has already been registered, processing in step S59 is executed. By contrast, when it is determined in step S58 that the game apparatus has not been registered, processing in step S60 is executed.

In steps S59 and S60, a connection response is transmitted from the access point apparatus 1 to the game apparatus 10 in response to the connection request. The connection response will be described in detail with reference to FIG. 15.

Figure 15:
FIG. 15 shows a content of data of a connection response.

FIG. 15 shows a content of data of the connection response. As shown in FIG. 15, the connection response includes the above-described connection information 43, a connection permission flag 81, and a random number value 82. The connection information 43 is read from the storage means (the storage section 3c or the memory 4c) of the access point apparatus 1 and transmitted as a part of the connection response.

The connection permission flag 81 included in the connection response indicates whether or not the connection response permits the connection. When the connection response permits the connection, the connection permission flag 81 is set to "1"; whereas when the connection response does not permit the connection, the connection permission flag 81 is set to "0".

The random number value 82 included in the connection response is, for example, 20-byte information generated in the access point apparatus 1, from which a WEP key is generated. In this exemplary embodiment, the random number value 82 is generated when the AP unit 4 is started. Accordingly, the random number value 82 is changed each time the AP unit 4 is started. When the connection response does not permit the connection, the random number value generated in the AP unit 4 is not included in the connection response, and the random number value 82 is set to "0".

Returning to FIG. 10, in step S59, the access point apparatus 1 transmits a connection response permitting the connection to the game apparatus 10. Specifically, the access point apparatus 1 transmits a connection response having the connection permission flag 81 of "1" and including the random number value 82 generated in the AP unit 4 to the game apparatus 10. After step S59, the processing in step S51 is executed again.

In step S60, the access point apparatus 1 transmits a connection response which does not permit the connection to the game apparatus 10. Specifically, the access point apparatus 1 transmits a connection response having the connection permission flag 81 of "0" and having the random number value 82 of "0" to the game apparatus 10.

After step S60, processing in step S61 is executed. In step S61, it is determined whether or not the user has instructed to register the game apparatus which requests registration to the registration list 44. Specifically, the access point apparatus 1 accepts an input for such an instruction from the user. When wishing to register the game apparatus 10, the user specifies a nickname corresponding to the game apparatus he/she wishes to register from the nicknames displayed on the screen 70 of the display section 3c. In step S61, the access point apparatus 1 determines whether or not such an input has been made. When it is determined that such an input has been made, processing in step S62 is executed. By contrast, when it is determined that such an input has not been made, the processing in step S62 is skipped and the processing returns to step S51.

In step S62, the game apparatus 10 is registered in accordance with the input made by the user in step S61. Namely, the access point apparatus 1 adds the identification information of the game apparatus specified by the user in step S61 to the registration list 44. After step S62, the processing returns to step S51. Thus, in step S58 in the next cycle, it is determined that the game apparatus specified by the user in step S61 has already been registered. Therefore, the connection between the game apparatus 10 and the access point apparatus 1 will be permitted.

With steps S51 through S62 described above, the access point apparatus 1 transmits a connection response to the game apparatus 10. Hereinafter, the processing executed by the game apparatus 10 will be described after the connection response is received.

Returning to FIG. 8, when a connection response is received, the game apparatus 10 executes processing in step S31. In step S31, it is determined whether or not the connection response permits the connection. This determination is made based on the value of the connection permission flag 81 included in the connection response. When the connection permission flag 81 is "1", the connection response is determined to permit the connection; whereas when the connection permission flag 81 is "0", the connection response is determined not to permit the connection. When it is determined in step S31 that the connection response permits the connection, processing in step S32 is executed. By contrast, when it is determined in step S31 that the connection response does not permit the connection, processing in step S30 is executed as described above. Namely, it is notified to the user that the connection resulted in a failure.

In step S32, a WEP key is generated from the random number value 82 included in the connection response. Specifically, the CPU core 21 executes the WEP key generation program 51 stored on the RAM 24 to generate a WEP key from the random number value 82. After step S32, processing in step S33 shown in FIG. 9 is executed.

In step S33, the game apparatus 10 transmits an authentication request requesting authentication processing to be executed with the access point apparatus 1. Specifically, the CPU core 21 transmits an authentication request including the identification information 53 stored on the RAM 24 from the wireless communication section 33.

Next, with reference to FIG. 10 and FIG. 11, processing executed by the access point apparatus 1 when receiving the authentication request will be described. Referring to FIG. 10, when receiving an authentication request in step S51, the determination result in step S52 is negative. Therefore, processing in step S63 shown in FIG. 11 is executed. In step S63, it is determined whether or not an authentication request has been received in step S51. When it is determined that an authentication request has been received, processing in step S64 is executed. By contrast, when it is determined that no authentication request has been received, i.e., when it is determined that a signal other than an authentication request (i.e., data for authentication) has been received, processing in step S67 is executed as described below.

In step S64, the identification information is checked. Namely, the access point apparatus 1 compares the identification information included in the authentication request with the identification information included in the registration list 44. Next in step S65, the access point apparatus 1 determines whether or not the identification information included in the authentication request matches any of the identification information included in the registration list 44. When it is determined that the identification information included in the authentication request matches one of the identification information included in the registration list 44, processing in step S66 is executed. When no identification information matches, processing in step S67 is executed.

In step S66, data for authentication is transmitted from the access point apparatus 1 to the game apparatus 10. The access point apparatus 1 stores the content of the data for authentication on the storage means. Then, processing in step S67 is executed.

Returning to FIG. 9, processing executed by the game apparatus 10 when receiving the data for authentication will be described. In step S34 after step S33, the CPU core 21 determines whether or not data for authentication has been received. When it is determined that data for authentication has been received, processing in step S37 is executed. By contrast, when it is determined that no data for authentication has been received, processing in step S35 is executed. When the determination result in step S65 (FIG. 11) is positive, the data for authentication is transmitted in step S66. Therefore, the determination result in step S34 is positive. By contrast, when the determination result in step S65 is negative, the processing in step S66 is not executed. No data for authentication is transmitted. Therefore, the determination result in step S34 is negative.

In step S35, it is determined whether or not a time-out has been generated, i.e., whether or not a predetermined time duration has passed since the authentication request was first transmitted. When it is determined that a time-out has been generated, processing in step S36 is executed. In step S36, it is notified to the user that the connection resulted in a failure. For example, the CPU core 21 displays a message that "the authentication with the access point apparatus 1 resulted in a failure" on the first LCD 11 or the second LCD 12. After step S36, processing in step S44 is executed as described below. By contrast, when it is determined that no time-out has been generated, the processing in step S33 and thereafter is repeated to transmit an authentication request again. The game apparatus 10 transmits an authentication request in repetition until the time-out is generated.

In step S37, the data for authentication received in step S34 is encrypted by the WEP key generated in step S32. Next in step S38, the data for authentication encrypted in step S37 (referred to as the "encrypted data") is transmitted from the game apparatus 10 to the access point apparatus 1.

Next, with reference to FIG. 11, processing executed by the access point apparatus 1 when receiving the encrypted data will be described. In step S67, it is determined whether or not encrypted data has been received. When it is determined that encrypted data has been received, processing in step S68 is executed. By contrast, when it is determined that no encrypted data has been received, the processing returns to step S51.

In step S68, the encrypted data received in step S67 is decrypted as follows. The access point apparatus 1 first executes the WEP key generation program 41 to generate a WEP key from the random number value 82 transmitted in step S59. Thus, the same WEP key as that of the game apparatus 10 is obtained. Then, the access point apparatus 1 decrypts the encrypted data received in step S67 with the WEP key.

In step S69, it is determined whether or not the decryption was successful in step S68. When it is determined that the decryption was successful, processing in step S71 is executed. When it is determined that the decryption was unsuccessful, processing in step S70 is executed.

In step S70, an authentication result notice indicating that the authentication resulted in a failure is transmitted from the access point apparatus 1 to the game apparatus 10. Then, the processing returns to step S51.

In step S71, an authentication result notice indicating that the authentication succeeded is transmitted from the access point apparatus 1 to the game apparatus 10. Thus, communication between the game apparatus 10 to which the authentication result notice is transmitted and the access point apparatus 1 is established. Next in step S72, communication processing is started between the game apparatus 10 and the access point apparatus 1. The subsequent processing is executed separately from the processing shown in FIG. 10 and FIG. 11.

Returning to FIG. 9, after the game apparatus 10 transmitted the encrypted data in step S38, it is determined in step S39 whether or not an authentication result notice has been received. When it is determined that an authentication result notice has been received, processing in step S42 is executed. By contrast, when it is determined that no authentication result notice has been received, processing in step S40 is executed.

In step S40, it is determined whether or not a time-out has been generated, i.e., whether or not a predetermined time duration has passed since the encrypted data was first transmitted. When it is determined that a time-out has been generated, processing in step S41 is executed. In step S41, it is notified to the user that the authentication resulted in a failure. For example, the CPU core 21 displays a message that "the authentication with the access point apparatus 1 resulted in a failure" on the first LCD 11 or the second LCD 12. After step S41, processing in step S44 is executed as described below. By contrast, when it is determined that no time-out has been generated, the processing in step S38 and thereafter is repeated to transmit encrypted data again. The game apparatus 10 transmits encrypted data in repetition until the time-out is generated.

In step S42, it is determined whether or not the authentication was successful. This determination is made based on whether the authentication result notice received in step S39 indicates that the authentication was successful or unsuccessful. When it is determined that the authentication was unsuccessful, the processing step S41 is executed as described above. In step S41, it is notified to the user that the authentication resulted in a failure. By contrast, when it is determined that the authentication was successful, the communication between the game apparatus 10 and the access point apparatus 1 is established. Therefore, in step S43, communication processing is started between the game apparatus 10 and the access point apparatus 1. After step S43, the game apparatus 10 terminates the processing for establishing the communication with the access point apparatus 1.

In step S44, it is determined whether or not the connection processing with the access point apparatus 1 is to be terminated. Namely, the game apparatus 10 allows the user to select whether or not to transmit a connection request again to the access point apparatus 1. When it is determined that the connection processing with the access point apparatus 1 is not to be terminated, i.e., when the user selects to transmit a connection request again, the processing returns to step S21. By contrast, when it is determined that the connection processing with the access point apparatus 1 is to be terminated, i.e., when the user selects not to transmit a connection request again, the game apparatus 10 terminates the processing shown in FIG. 8 and FIG. 9.

As described above, in this exemplary embodiment, the display manner on the display section 3c of the access point apparatus 1 is varied in accordance with the value of a signal flag included in a connection request. Owing to such a system, even when a plurality of game apparatuses are requesting connection at the same time, the user can easily identify each game apparatus by the display manner. The user cannot mistakenly take a game apparatus to be permitted for connection for a game apparatus not to be permitted for connection, or vice versa. The user is accurately notified of the existence of the plurality of communication terminals requesting permission for connection.

As described above, in this exemplary embodiment, the authentication using the WEP key (steps S66 through S69) is executed only on a game apparatus registered in the registration list 44. A game apparatus is registered only when the user permits the registration. Therefore, the authentication using the WEP key is not executed on a game apparatus which is determined by the user not to be permitted for connection, and the connection results in a failure. Thus, unnecessary authentication processing is avoided. According to this exemplary embodiment, the authentication processing can be efficiently performed.

In this exemplary embodiment, the user selects whether or not to permit the connection (step S2) before the authentication processing is executed using an encryption key (steps S7 through S10). In other exemplary embodiments, the authentication processing may be executed before the user makes the selection. Alternatively, the connection may be permitted only by the selection by the user without executing the authentication processing.

In this exemplary embodiment, the signal flag 62 which can be set to "0" or "1" is used as information representing the display manner on the access point apparatus 1. The display manner is varied only between two manners, emphasized display and normal display. In other exemplary embodiments, the display manner may be varied among three manners. Information which represents one of the three or more manners (display manner information) may be determined by the selection by the user, and such information may be included in the connection request instead of the signal flag 62. In this exemplary embodiment, the value of the signal flag 62 is varied by the input by the user. In other exemplary embodiments, the display manner information may be preset in the game apparatus, so that each game apparatus uses a different display manner. For example, the color of the letters of the user name information displayed on the screen 70 may be preset to be different among the game apparatuses, or the type of an image of the icon, character or the like which is displayed in the vicinity of the user name information may be preset to be different among the game apparatuses. Thus, each game apparatus can use a different display manner without the user making an input, which alleviates the trouble imposed on the user.

According to this exemplary embodiment, when the game apparatus 10 is already registered in the access point apparatus 1, the user does not need to conduct a registration operation (steps S58 and S59). Namely, the user needs to register the game apparatus 10 in the access point apparatus 1 only once and does not need to perform the registration operation repeatedly. This makes the connection to the access point apparatus 1 easier.

According to this exemplary embodiment, the access point apparatus 1 includes the information processing device 3 and the AP unit 4 detachable from the information processing device 3. Therefore, the user can connect the AP unit 4 to another information processing device and thus easily use the another information processing device as an access point apparatus. For example, the user can connect a personal computer in his/her friend's house to use the personal computer as an access point apparatus and connect the game apparatus 10 to the network. According to this exemplary embodiment, the registration list 44 is stored in the AP unit 4. Therefore, even when the AP unit 4 is connected to another information processing device, it is not necessary to re-register the game apparatus 10.

In another exemplary embodiment, the registration list 44 may be stored in the information processing device 3. In this case, even when the AP unit 4 is changed, the content of the registration list 44 owned by the access point apparatus 1 does not change. Even if the user loses the AP unit 4 and connects a new AP unit to the information processing device 3, the registration list 44 is maintained and the user does not need to re-register the game apparatus 10.

Figure 16:
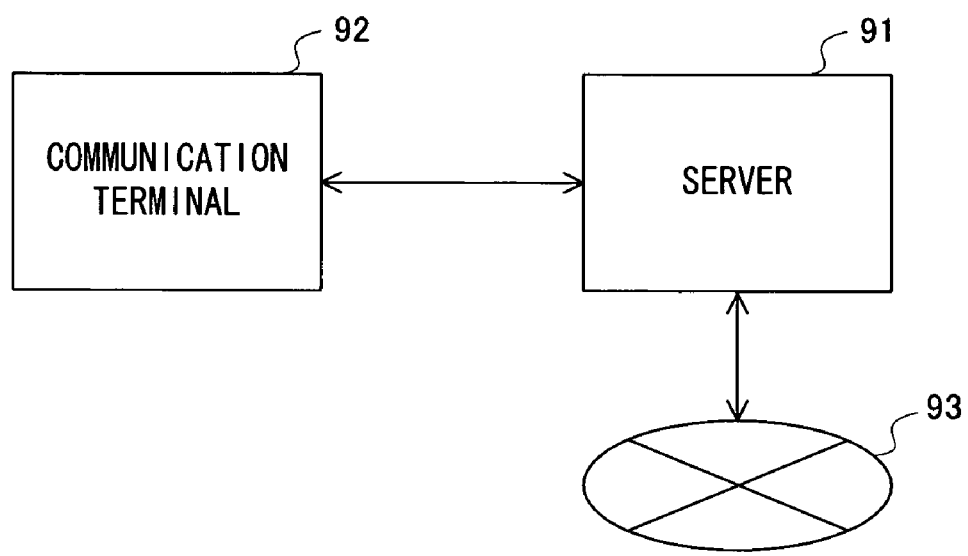
FIG. 16 shows a structure of a communication system according to another exemplary embodiment.

In the above exemplary embodiment, a mobile game apparatus is described as an example. The communication terminal according to the certain exemplary embodiments described herein is not limited to a game apparatus, and may be any terminal which is wirelessly communicable with an access point apparatus. FIG. 16 shows a structure of a communication system according to another exemplary embodiment. The certain exemplary embodiments described herein are applicable to a communication system as shown in FIG. 16, i.e., a communication system in which a server 91 connected to a network 93 and a communication terminal 92 are connected in a wired manner. The server 91 is, for example, a personal computer, and controls the connection of the communication terminal 92 to the network 93. The communication terminal 92 is not limited to a mobile game apparatus as described above and may be, for example, an installation type personal computer. The communication system shown in FIG. 16 operates in substantially the same manner as the game apparatus 10 (see FIG. 8 and FIG. 9) except that the server 91 and the communication terminal 92 are connected in a wired manner. The server 91 operates in substantially the same manner as the access point apparatus 1 (see FIG. 10 and FIG. 11).

As described above, the certain exemplary embodiments described herein provide a communication system capable of accurately notifying the existence of a plurality of communication terminals requesting a permission for connection, and is applicable to a communication system or the like for performing a communication game via an access point apparatus using a mobile game apparatus.

While certain exemplary embodiments have been described in detail, the foregoing detailed description is in all aspects illustrative and not restrictive. It is understood that numerous other modifications and variations can be devised without departing from the scope of these certain exemplary embodiments.

What is claimed is:

1. A communication system, comprising:
    a connection control apparatus for controlling connection to a network; and
    a communication terminal communicable with the connection control apparatus:

wherein:
the communication terminal includes connection request programmed logic circuitry for transmitting a connection request to the connection control apparatus, the connection request including communication terminal information for identifying the communication terminal and display manner information representing a display manner in which the communication terminal information is displayed on a display device of the connection control apparatus; and
the connection control apparatus includes:
a display controller for displaying particulars of the communication terminal information included in the connection request, transmitted from the communication terminal, in the display manner represented by the display manner information included in the connection request; and
selection programmed logic circuitry for allowing a user to select whether the communication terminal corresponding to the communication terminal information displayed on the display device is to be permitted for connection or not.

2. A communication system according to claim 1, wherein the communication terminal further includes:
input acceptance programmed logic circuitry for accepting a predetermined operation from the user; and
a request generator for generating a connection request with the particulars of the display manner information being varied in accordance with whether the predetermined operation has been accepted or not.

3. A communication system according to claim 2, wherein:
the input acceptance programmed logic circuitry detects whether or not the predetermined operation has been made at an interval of a predetermined time duration; and
the request generator transmits a connection request each time the input acceptance programmed logic circuitry detects whether or not the predetermined operation has been made.

4. A communication system according to claim 3, wherein the request generator transmits a connection request including display manner information representing a first display manner when the input acceptance programmed logic circuitry detects that the predetermined operation has been made, and transmits a connection request including display manner information representing a second display manner which is different from the first display manner when the input acceptance programmed logic circuitry detects that the predetermined operation has not been made.

5. A communication system according to claim 1, wherein the communication terminal information includes user information which is set by the user in the communication terminal.

6. A connection control apparatus for controlling connection to a network, the connection control apparatus being communicable with a communication terminal, wherein:
the communication terminal transmits a connection request to the connection control apparatus, the connection request including communication terminal information for identifying the communication terminal and display manner information representing a display manner in which the communication terminal information is displayed on a display device of the connection control apparatus; and
the connection control apparatus comprises:
a display controller for displaying particulars of the communication terminal information included in the connection request, transmitted from the communication terminal, in the display manner represented by the display manner information included in the connection request; and
selection programmed logic circuitry for allowing a user to select whether the communication terminal corresponding to the communication terminal information displayed on the display device is to be permitted for connection or not.

7. A non-transitory computer-readable storage medium having stored thereon a communication program executable by a computer of a communication terminal which is communicable with a connection control apparatus for controlling connection with a network, wherein:
the communication terminal has stored therein communication terminal information for identifying the communication terminal; and
the communication program causes the computer to execute:
generating a connection request including the communication terminal information and display manner information representing a display manner in which the communication terminal information is displayed on a display device of the connection control apparatus; and
transmitting the generated connection request to the connection control apparatus.

* * * * *